United States Patent [19]

Chambers et al.

[11] Patent Number: 5,312,482

[45] Date of Patent: May 17, 1994

[54] WATER REDUCIBLE ARTISTS' OIL PAINTS COMPOSITIONS

[75] Inventors: Godfrey Chambers, Toms River; Wayne M. Hoyte, Parlin, both of N.J.; George J. Stegmeir, New York, N.Y.

[73] Assignee: M. Grumbacher, Inc., Cranbury, N.J.

[21] Appl. No.: 933,995

[22] Filed: Aug. 21, 1992

[51] Int. Cl.$^5$ .................... C09D 5/06; C09D 191/00
[52] U.S. Cl. ..................... 106/243; 106/294; 106/250; 106/251; 106/252; 106/253
[58] Field of Search ............ 106/250, 251, 252, 253, 106/243, 244; 106/250, 251, 252, 253, 243, 244

[56] References Cited

U.S. PATENT DOCUMENTS

| | | | |
|---|---|---|---|
| 3,668,098 | 6/1972 | Daimer et al. | 106/252 |
| 3,789,046 | 1/1974 | Heidel | 106/252 |

Primary Examiner—David Brunsman
Attorney, Agent, or Firm—Paul J. Sutton

[57] ABSTRACT

This invention provides a water-reducible oil paint, capable of maintaining a stable suspension of coloring pigment during storage, and having the mechanical, coloring and drying properties of a traditional oil paint. The oil paint comprises a pigment, a base gel composition and an emulsifier- amine soap composition; the base gel composition comprises a traditional drying or semi-drying oil or oil acid, a nonionic or mixed nonionic-anionic emulsifier, having an HLB value in the range of from about 8 to about 18, and a thixotropic gel stabilizer; the emulsifier-amine soap composition comprises at least one amine soap of an acid, selected from mono- and di-unsaturated drying oil acids, and a nonionic or mixed nonionic-anionic emulsifier. The preferred embodiment of this invention is a high-solids artists' oil paint.

18 Claims, No Drawings

WATER REDUCIBLE ARTISTS' OIL PAINTS COMPOSITIONS

This invention relates to an artists' oil paint composition and more particularly to an artists' oil paint composition which is reducible by water. The invention also relates to a method for producing such water-reducible artists' oil paints and industrial coatings and stains.

A great deal of effort has been expended by the coating industry to provide a paint which has long term shelf stability, is capable of maintaining its attributes after it has been applied, and is relatively non-toxic, and is reducible and can be cleaned, using ordinary water. The great and understandable interest in reducing pollution, both of the air and of ground water, and the undeniable problems created by the use of the usual organic solvents, has resulted in continuing efforts on the part of the coating industry to revise formulations so as to reduce inherent toxicity and to provide a coating which, although oil based, is reducible or compatible in water. A certain degree of success has been achieved in that part of the coating industry which is directed primarily to coatings, i.e., the application of a uniform film to various substrates for protective and decorative purposes. It has been recognized that oil-based paints provide the most effective protection to substantially any substrate and as a result much effort has been aimed at modifying such products so that they can use water rather than organic solvents to reduce the paint for application purposes, as well as to achieve easy clean-up using only water and/or an aqueous solution of detergent material.

For example, U.S. Pat. No. 3,804,787 describes oil solvent-type paints, where a pigmented solution of a water-insoluble, film-forming base resin in a water-immiscible liquid, has been prepared, wherein the base resin solution is completely emulsifiable in an aqueous synthetic detergent solution when there is no pigment, but is only partially dispersible in water when a pigment is present. This material had been improved by treating at least a portion of the pigment dispersed in a water-immiscible liquid, with an auxiliary resin which is both co-emulsifiable in the aqueous detergent solution along with the pigment, when the solution is dissolved in the water-immiscible paint composition, and wherein the auxiliary resin is also preferentially adsorbed by the pigment from a solution of the base resin, and the auxiliary resin, in the water-immiscible liquid base of the paint composition. A further improvement is shown by U.S. Pat. No. 3,920,597 where a particular auxiliary resin comprising a drying oil-modified, alkyd resin containing more than 50% by weight of a polyethylene glycol moiety is also incorporated in the paint composition, together with a compound having detergent properties. The detergent compound is soluble in the base resin solution of a water-immiscible liquid and when combined with water provides detergent properties.

A water-dispersible alkyd paint composition is also disclosed in U.S. Pat. No. 4,071,514, wherein the alkyd resin itself is made miscible and dilutable with water, although assertedly retaining the desired properties of alkyd paints, which had usually been known as oil-based paints. This latter patent utilizes the reaction of the alkyd paint resin with a so-called "syndet moiety", which had been formed by the reaction of a conjugated vegetable or animal oil, such as linseed, sunflower, soya, safflower, menhaden, and the like, with a dibasic acid anhydride and a polyglycol. This syndet moiety is then reacted with from 3 to 4 parts of an alkyd of the type normally used for protective coatings. A water-based paint is then formed.

The usual coating type paints, however, are not suitable for use as artists' oil paints. A standard specification for artists' oil, resin-oil and alkyd paints, ASTM method D4302-90, requires such artists' oil paints to have the following general characteristics:

1. The consistency and the manipulative characteristics of a short, buttery paste, meeting the working characteristics of a traditional artists' oil color;
2. Chroma, purity of mass tone, and tinctorial strength;
3. Miscibility with conventional vegetable drying oils, paint mediums and solvents commonly used in oil painting techniques;
4. Sufficient stability to reduce phase-separation and premature hardening in a container; and
5. Drying properties and durability characteristics that provide the archival nature of a professional grade artists' oil paint film; and Attempts have been made, to provide artists' oil paints which have adequate water-miscible characteristics to permit easy clean up with water, and further to permit reducibility of the oil paint using water. All of this must be accomplished, without losing the desirable characteristics set forth above of an artists' oil paint as is well known to working artists. One such attempt to achieve this end is shown in Swiss Patent No. 651,846, which describes an artists' oil paint based on drying oils, pigments and other common additives, which also contains a surface-active emulsifier with an HLB value of between 10 and 13.

Unfortunately, none of the earlier compositions resulted in an artists' oil paint which maintains substantially the same manipulative and archival characteristics for which oil paints are noted and which are required by the working artist for proper application by various techniques.

It is, accordingly, an object of the present invention to provide a water-reducible artists' oil paint composition of professional oil paint quality, which substantially maintains the mechanical characteristics of an artists' oil paint during application on canvas or other substrate. It is a further object of the present invention to provide such characteristic oil paint properties in a water-reducible composition which can be mixed with ordinary oil paints. It is yet another object of the present invention to provide artists' paint having classic oil paint properties which can be reduced, if desired, utilizing ordinary water, and which can be cleaned up using tap water. A further object of this invention is to provide a water-reducible artists' oil color which can be blended with any of the traditional artists' oil colors, and adjunct materials. It is also an object of this invention to provide an water-reducible industrial coating.

Therefore, in accordance with this invention, there is provided a water-reducible artists' oil paint, capable of maintaining a stable suspension of pigment during storage, and having the mechanical, coloring and drying properties of a traditional oil paint. The oil paint of this invention is formed from a base gel composition and an emulsifier/amine soap composition. The base gel composition comprises a traditional drying or semi-drying oil, such as linseed oil, safflower oil, sunflower oil, soya oil, poppyseed oil or walnut oil and the like natural unsaturated vegetable oils, or animal oils, such as menhaden oil, formed of drying acid esters; a nonionic or mixed nonionic-anionic emulsifier, having an HLB value in the range of at least about 8 and generally not greater than about 18; and a thixotropic gel stabilizer. The emulsifier amine soap composition also acts as a gel stabilizer to maintain the desired short, buttery consistency in the presence of water or other diluents, and comprises an amine soap of mono- and di-unsaturated drying oil acids with a nonionic or mixed nonionic-anionic emulsifier. The gel base and the amine soap are admixed in proportions in the range of from about 3:1 to about 8:1.

It is also possible to substitute for, or to supplement, the natural drying oils with segregated fractions of the natural oils, including a mono-unsaturated acid ester, such as the glycerides of oleic acid, i.e., cis-9-octadecenoic acid, a diunsaturated acid ester, such as the glycerides of linoleic acid, so-called purified fatty acids, such as tall oil fatty acids (TOFA) or linseed oil fatty acids (LOFA), and a triunsaturated acid ester, such as the glycerides of linolenic acid. Generally, esters of unsaturated fatty acids having from 12 to 24 carbon atoms, whether natural or synthetic, can be used. Normally any of the commonly used unsaturated vegetable, nut or marine oils can be used, including in addition tung and menhaden oils, or unsaturated fraction of other natural oil, such as tallow derivatives, as well as synthetic esters.

The emulsifier useful for the oil color composition of the present invention, preferably is a nonionic, or a nonionic-anionic blend of compounds which provide a hydrophilic/lipophilic balance (HLB) in the broad range of between 8 and 18. Most preferably, the emulsifier is one having an HLB in the range of between about 8.5 and about 16 and is selected from the groups including polyoxyethylene acids, ethoxylated sorbitol and sorbitol esters, ethoxylated triglycerides, polyethylene glycols, ethoxylated fatty amines, polyethylene glycol fatty acid esters, and ethoxylated sorbitol esters, especially the polyethoxylated derivatives of the oleic esters of polyhydric alcohols, such as sorbitol or glycerol. It has been found that the HLB value by itself is not sufficient to determine the most suitable emulsifiers. It is preferred that an emulsifier be used which is also compatible with the primary drying oil that is used and is nonionic, or with mixed anionic-nonionic emulsifiers. The best results have been found with compounds which include a related monounsaturated group, such as the polyoleate esters of polyhydric alcohols, which are also ethoxylated, as described above; the emulsifier is preferably capable of undergoing oxidative drying and cross-linking with the principal drying oil which is present, so as to improve the properties of the final resinous coating; the use of a compatible co-reacting group on the emulsifier, such as the unsaturated lipophilic oleate tail on the oleic acid esters of the oxyethylated sorbitol, provides the best combination for hydrophilic/lipophilic balance (HLB) and chemical compatibility, to insure the integrity and high strength of the binder material.

In order to assure the desired uniform short, buttery, consistency of an artists' oil color for the modified water-reducible oil colors of the present invention, regardless of the pigment used, it is preferred to incorporate a chemically compatible, gel stabilizer into the oil base. Such stabilizers can be defined in terms of their activity in maintaining the desired and uniform short consistency expected of a traditional oil color.

In traditional oil colors, stabilizer materials which have been used have included:

a. Waxes or wax-like material known to produce a colloidal or gelatinous condition in the oil/pigment system of an oil color; (in the system of the present invention, these would require a higher HLB for emulsifiers and additional amine soap neutralization); or b. Aqueous solutions, such as casein, which produce the desired consistency effect by forming an emulsion in the oil, which would result in low stability for the present invention; or c. Certain inert pigments, such as alumina hydrate, which work in the oil to produce so-called short pastes, as well as metallic soaps, such as aluminum stearate which have a similar effect. However, the metallic soaps tend to cause the oil film to become brittle with age and deteriorate. It is also believed that they can promote the yellowing of the oil, which is especially undesirable when used with a white or light colored pigment. Generally, no more than about 2% by volume of the metallic soaps should be used in the present invention.

Preferably, however, it has been found that the most desirable stabilizers are thixotropic compounds which are chemically compatible with the oil base. Thus, dehydrated castor oil derivatives, such as Thixcin R, which contain primarily ricinoleic acid derivatives, and other compounds which have similar monounsaturated hydroxy acid groups are preferred. It has been found that such castor oil derivatives also enhance resistance to yellowing of the oil paint and can be used to form a water-reducible transparentizer base or gel, with up to 2% by weight of a metal soap, such as aluminum stearate.

In order to prepare a stable, intermediate base, or gel, which can be used with all pigments, including reactive pigments, such as zinc oxide, a careful activation procedure is preferably followed. A compatible stabilizer is added to a mixture of a suitable drying oil, or combination of drying oils, and a compatible emulsifier, in a jacketed vessel, with a high speed disperser attachment, e.g., a Cowles disperser. After a uniform and smooth consistency has been achieved, the mixture is gradually heated to from 120 to 170 degrees F, while continuing to mix at a lower speed setting using a planetary type mixer; the maximum temperature is maintained for from about ten to about fifteen minutes, for the gel to become fully activated. The heat is removed, and the mixture is permitted to cool with continued low-speed mixing, to obtain a smooth, water-miscible gel composition having a short, buttery consistency. Preferably, a combined mixer, capable of providing both Cowles type (high speed) and planetary-type (low speed) mixing is used. An example of such a dual function mixer is the High Shear Power Mix Dispenser, by Ross.

Traditional stabilizers, such as the metal soaps, such as aluminum or zinc stearates, or waxes, could be used in the base gel when the reactive pigments are absent, either alone or in combination with the compatible stabilizers, such as the castor oil derivative. Generally, less total amount of the compatible stabilizer is required than of the traditional stabilizers, to achieve the same effect.

The amine soap composition is formed by first reacting one or more unsaturated free fatty acids with an excess of the stoichiometric neutralization amount of a hydroxyamine compound; preferably, there is about 5 to about 15% excess molecular equivalents of the hydroxyamine to the fatty acid. The neutralization reaction is exothermic, and should be completed, generally within about 30 minutes, before the addition of the emulsifier.

The fatty acids preferably are mono- or di-unsaturated, and can be the same or different than the acids present in the ester form in the natural drying oils, such as linseed oil; the fatty acids can contain from about twelve to about twenty-five carbon atoms, and most preferably from 14 to 20 carbon atoms. Generally, too high a molecular weight will result in an excessively tacky product.

The hydroxyamine preferably has from about three to about six carbon atoms, and most preferably includes a branched chain hydrocarbon group. The most suitable amines are those which form a low boiling azeotrope with water, and thus can most easily evaporate during drying of the oil paint.

The base oil gel preferably can contain any of the usually used drying oils, such as natural oils, e.g. linseed oil, perilla oil, sunflower oil, or poppyseed oil, or modified such oils, or tailored blends of fractions of natural drying oils, including both liquid and solid additives, such as oleic, linoleic and linolenic acids. Similarly, it can be useful to add or substitute for any one or more of these oils the purified fractions, such as the glycerides of oleic acid, of linoleic acid or of linolenic acid. The base gels can contain, preferably, between about 30 and about 80 parts by weight of the drying oil, from about 2 to about 15 parts by weight of the desired emulsifier, and from about 2 to about 15 parts by weight of the thixotropic stabilizer. The artists' oil paint of this invention is formulated by combining the above-described base gel and amine soap composition to provide the desired consistency and texture necessary for the proper application of the oil color in normal artists' usage, when combined with conventional paint driers and the normal amount of the pigment colors. Generally, slightly more than the usual amount of the paint drier shall be added to compensate for any inhibition of drying time caused by, e.g., reduction of the oil paint with water. Generally, substantially all pigments normally used for oil colors can be used with the water-reducible compositions of the present invention, except possibly for certain pigments which are known for their sensitivity to alkaline conditions, such as iron blue.

The most commonly available, and most commonly used, drying oil is linseed oil of various grades; any of these grades, such as raw linseed oil, cold pressed linseed oil, alkali refined linseed oil, acid refined linseed oil, boiled linseed oil or blown linseed oil, can be used for the paint of this invention. Each of these grades of linseed oil and procedures for their use and manufacture are well known in the art. When forming white, or other light color oil paint, an approximately 9:1 mixture of poppyseed and sunflower seed oil can be used to avoid yellowing and to maintain the other attributes obtainable when using linseed oil.

The emulsifiers/surfactants which are useful in the present invention, as explained above, not only should have the desired HLB values, but also preferably should have the desired chemical compatibility. It is thus preferred that compounds be used which include the desired degree of unsaturation to permit cross-linking with the drying oil during drying, or film formation. Thus, not only are the defined esters of oleic acid useful, as set forth above, but also for example esters of linoleic or linolenic acid, as well as other monounsaturated acids or diunsaturated acids, both conjugated and unconjugated acids, which provide the desirable HLB values with the remaining portions of the emulsifier molecules, such as the polyoxyethylene groups and the sorbitol groups Generally, at least about 8% by weight, of the drying oil, of the emulsifier is used.

Similarly, in selecting the neutralization compounds, in addition to the lower alkyl hydroxyamine compounds described above, wherein the saturated alkyl groups preferably contain no more than about 5 carbon atoms, higher amines, e.g. secondary or tertiary amines, such as triisopropanolamine, diisopropanolamine, diethanolamine, and triethylamine and ethylpropylamine, or even ammonia admixed with an amine, can also be used for neutralizing the acids. It must be pointed out, however, that when selecting a neutralizing compound, it is preferred that the resulting neutralized soap be also capable of providing some degree of surface agent activity in combination with the other emulsifiers added.

As also explained above, the preferred gel stabilizer materials for providing the desirable short buttery consistency to the final oil color product, are chemically compatible, i.e., they are suitably unsaturated, preferably aliphatic groups and thus capable of reacting to cross-link together with the drying oils. The dehydrated ricinoleic acid groups in castor oil provide this activity.

The artists' oil paint of this invention was prepared to the desired buttery short consistency by admixing the base gel composition with the amine soap composition described above. The amine soap composition is usually present admixed with the base gel composition in a proportion of not less than about 4% by weight of the combined vehicle, and preferably in a proportion of between about 7 and about 25% by weight of the vehicle. In most cases, it is most preferred that the proportion of the amine soap composition be in the range of between about 10 and about 20% by weight of the vehicle, depending upon the particular pigment that is to be utilized. It is believed that the amine soaps associate with the vehicle on the surface of the pigment particles, and promote emulsification of the system in water, especially in the presence of the other surface active compounds.

Generally, inorganic pigments required lower levels of neutralization by the amine soaps than did organic pigments. It is believed that the relative hydrophobicity of the pigment molecules is significant. In addition, certain of the colors, for example, paints containing pigments of the following types: P Br:7, P Y:1, PR:108 (as defined in the *Color Index Reference Book, Volume III*, 3rd Edition, (Pub.by American Association of Textile Chemists and Colorists 1987)), are further improved by utilizing a supplemental emulsifying agent of the acetylenic diol type; the acetylinic surfactants are compatible with the drying oils of the present invention because they potentially can cross-link with the drying oils due to their internal unsaturation.

The traditional definition of an artist's oil paint, as set forth in ASTM D4302, requires that the vehicle only contain vegetable drying oils. The oil colors of the present invention utilize additional fatty acids as explained above; but all of these acids should be compatible to those found in the natural vegetable drying oils, as described above for the base oil gel, and are preferably the same acids in the free acid form.

The preferred grade of the artists' oil paint of the present invention is defined as a "paste type of paint", and the consistency, or viscosity, must be such that the paint does not flow or level when applied with a palette knife. This has been a major problem with the earlier attempts to provide a water-reducible artists' oil color. The compositions of the present invention do achieve this required consistency. Preferably, it is also possible to achieve the drying time required by the above ASTM D4302 specification, such that at a relative humidity of between 50 and 75%, and a temperature in the range of from 65 to 80 degrees F. (18 to 27 degrees C.), the dust-free drying time, as determined by test method D1640 ASTM, is not more than 10 days.

Yet a further advantage of the present invention is that the oil colors can be prepared using, e.g., a linseed oil which has not been alkali treated, but rather is of the less costly, raw type. The reason for this advantage is that in the course of processing the raw linseed oil in accordance with the present invention, the excess acid is removed in the formation of the water-reducible oil system.

Other supplemental emulsifying agents which are useful include the ethoxylated secondary fatty alcohols, such as the Tergitol Series available from the Union Carbide Corporation; the ethoxylated primary fatty alcohols, such as the Neodols, available from Shell Chemicals Company.

The present process can be used to produce a wide range of coatings, including wood stains, wood glazes, metal paints and primers, ceramic glazes, concrete sealants and topcoats, glazing compounds for tiles and the like, and overprint varnishes for paper, and natural or synthetic fabrics; however, the process and the compositions of this invention have particular applicability for the production of artists' oil paints, where a short buttery consistency is a requirement for a successful product. It has been found that the water-reducible property of the invention is achieved without significant loss of the desirable properties of a traditional artists' oil paint product.

When utilizing this invention to prepare an industrial coating, such as an oil stain or a highly pigmented load paint, the gel base and amine soap of the present invention can be used together with additional drying oil, and at a higher proportion of gel base-to-amine soap, to form the vehicle. This can be accomplished by either first preparing an artists' oil color, and then modifying that product with additional gel base and drying oil, or combining all of the ingredients together, i.e., from about 20 to about 30 parts by wt. of the gel base, from about 2 to about 10 parts of the amine soap, from about 25 to about 50 parts of additional drying oil, from about 2 to about 5 parts emulsifier, and from about 1 to about 40 parts pigment, and other needed additives, such as anti-skinning agents and driers, as is generally used in the art.

Overall, the industrial coatings of this invention comprise from about 0.5 to about 40 parts of pigment, giving a high tinctorial strength, and water-reducibility. These compositions are thus superior to the previously available materials, whether stains or high load paints.

This invention is exemplified by but is not exclusive of, the following examples. Unless otherwise stated or obvious from the context, terminology is used in accordance with the definitions and meanings used in the corresponding ASTM specification and in which parts or percentages are by volume unless otherwise stated.

EXAMPLE 1

A titanium white, water reducible artists' oil paint was prepared by the following two part method:

A. Preparation of Base Gel Composition

To 860 parts of linseed oil is added 86 parts of a polyoxyethlene sorbitol hexaoleate ester (sold as Atlas G1086) and 44 parts of a castor oil derivative (Thixcin R from Rheox) which had been premixed. The castor oil-emulsifier mixture is added to the linseed oil in a steam kettle having a dual function Ross High Shear Power Mix Dispenser, which provides a planetary mixer and a high speed disperser type mixer (of the Cowles type), operating at slow speed, i.e., at about 2400 rmp, until the mixture is smooth and free from lumps. In accordance with standard practice for the processing of such castor oil derivatives, the mixture was then gradually heated to about 150 degrees F., and maintained at that temperature for between 10 and 15 minutes, so that the gel became fully activated. The heating is then discontinued, but the mixture continues to be continuously mixed to maintain even heat distribution during the cooling period. The resultant cooled gel is smooth and of a short buttery consistency. Tests on a Brookfield viscometer showed a viscosity of between 2,000,000 and 2,500,000 cps.

B. Preparation of Amine Soap Composition

The amine soap composition was prepared by reacting, without additional heat, a mixture of 380 parts of an oleic acid product and 380 parts of a linoleic acid product with 164 parts by weight of 2-amino-2-methyl-1-propanol (AMP 95, by the Angus Chemical Company). The oleic acid product contains 73% oleic acid, 8% linoleic acid, 6% palmitoleic acid, 3% myristoleic acid, 1% linolenic acid and 9% $C_{14}$–$C_{17}$ saturated carboxylic acid, and is sold under the mark "EMERSOL 213" by the Henkel Corporation. The linoleic acid product is sold as "EMERSOL 315" by Henkel, and contains 65.5% linoleic acid, 19.5% oleic acid, 10.5% linolenic acid and 3.5% palmitoleic acid. The exothermic neutralization reaction was completed after about 20 to 25 minutes, and then a polyethoxylated ester of oleic acid (76 parts by wt.) was added during cooling. The fatty acids are "over-neutralized", i.e., to a free acid number of essentially zero, and at this value the material was found to provide the desired result when mixed with part of the gel base.

C. Artists' Oil Color

The gel base, 222 parts by wt., and 45 parts by wt. of the amine soap composition, together with 440 parts by wt. of titanium dioxide pigment, 292 parts by wt. of zinc oxide pigment, and 1 part by wt. of a 6% solution of cobalt tallate (a siccative) in mineral spirits, were initially mixed with a planetary type mixer until blended homogeneously; the blend was then processed on a three-roller mill to achieve the desired fineness of grind and to achieve a final Brookfield viscosity in the range of from 3.2 million to 5 million cps.

The product of this Example 1 is a solventless, high solid linseed oil artists' paint, with the desired buttery, short consistency and the property of water reducibility inherently built into it. The product was found to be capable of achieving gradations and blend effects, as with standard artists' oil colors, with the option of using water as the thinner instead of organic solvents. In addition the unhardened paint can be cleaned up using soap and water, rather than organic solvents.

The oil paint product of this Example 1 retains the brilliant white color of the same pigment in traditional artists' oil paint, and the light fastness, quality, and uniform color, as required by ASTM Standard Specification D4302-90. The product of this invention when applied as a normal oil color, dries sufficiently within 6 months to 1 year after application to enable varnishing for permanent archival protection. The resulting color has the desired chroma, purity of mass tone and tinctorial strength as required for a traditional artists' oil color and retains the necessary miscibility with conventional vegetable drying oil, other paint mediums and solvents commonly used in oil painting techniques, thereby permitting any desired commingling with traditional oil colors. At the same time, the material remains water miscible to enable easily homogenizable mixtures with clean tap water, and also to facilitate convenient cleaning using only soap and water. There is sufficient tube stability to overcome phase separation and premature hardening during storage under normal ambient temperature conditions, and the non-toxicity of the modifiers at the levels used in the formulations is acceptable in accordance with ASTM method D4236-90, as standard practice for labeling artists' material for chronic health hazards.

The viscosity of this oil color is no greater than and the short consistency is equal to, a well formulated professional grade artists' oil color as measured on a Brookfield digital viscometer. When the product was spatulated on a glass plate, the oil color formed sharp, crisp peaks that did not slump, and was of a consistency similar to medium soft butter or oleomargarine. There was no spongy or waxy feel during spatulation nor any trace of gumminess.

When reduced with tap water at room temperature, the resulting diluted color spreads evenly with either brush or knife, without evidence of streakiness, gumminess, beading or seeding. When admixed with small to moderate amounts of conventional artists' oil colors or organic diluents (not more than about 30% by volume), the product of this invention remained reducible with plain tap water.

Drying characteristics specifically met the requirement of paragraph 6.11 of ASTM D4302, in that a 3 mil drawdown on a lacquer sealed panel (Morest Card) at a relative humidity of between 50% and 75% and an ambient temperature of between 56 degrees F. and 80 degrees F., dries within 10 days. The testing for dry film adhesion of the oil colors of the present invention is equivalent to that of traditional oil colors, on a color by color basis. This applies to samples applied to the ground and in layers, in undiluted form as well as in reductions with water alone and conventional solvents alone. The samples are permitted to dry under ambient temperature and humidity conditions for 4 to 6 months before testing in accordance with method A of ASTM D3359-87, and show satisfactory adhesion.

EXAMPLE 2

A transparentizer gel was prepared in a three roller mill as follows: linseed oil (75 parts by weight), fatty acid ester emulsifier (as described above, 8 parts), gel base composition (as prepared above, 415 parts), amine soap composition (as prepared above, 87 parts), alumina hydrate pigment (415 parts) and 6% solution of cobalt tallate (3 parts). This transparentizer gel containing alumina hydrate, performs equally to traditional oil colors in accordance with ASTM 4302-90.

EXAMPLE 3

A cadmium red artists' oil paint is prepared utilizing 134 parts of the base gel (A) and 54 parts of the amine soap composition (B), mixed with additional linseed oil (55 parts) and 37 parts of aluminum stearate stabilizer. There is further added 7.5 parts of the additional polyoxyethylene sorbitol hexaoleate fatty acid ester emulsifier, 0.5 parts of 6% cobalt tallate and 7.5 parts of SCM red No. 667 (low solubility grade) of cadmium red pigment.

As with Example 2, the pigment is first well mixed into the additional linseed oil vehicle until it is fully wetted out, and then dispersed with the remaining ingredients on a three-roller mill to a specified fineness of grind, i.e., between about 10 and about 15 microns (5.5 to 6.5 on the Hegeman gauge). After being fully mixed to the desired fineness of grind, the oil color must be again heat stabilized in order to develop the full effectiveness of the stabilizer agent. The material is treated at a temperature range of between 120 degrees F. and 170 degrees F. for from 15 to 20 hours. The mixture is then cooled to room temperature without any seeding occurring as long as there was proper dispersion before being heated to the activation temperature. It was found that this additional activation heating was necessary to recover the consistency and manipulative characteristics lost during the high shear mixing procedure. This heat stabilization treatment ensures activation of the castor oil stabilizers thus insuring the in-can stability of the final oil paint products.

Similar paint compositions were prepared, following the above procedures, but with the compositions, as shown by Table I, below:

TABLE I

| | | | PARTS BY WEIGHT | | | | |
|---|---|---|---|---|---|---|---|
| Example No. | Color | Pts. by Wt. | Gel Base | Amine Soap | Aluminum Stearate | Linseed Oil | Emulsifier |
| 4 | Burnt Sienna PB17 | 53 | 26 | 5.0 | 3.0 | 10 | 1.0 |
| 5 | Cobalt Blue PB26 | 52 | 10 | 5.0 | 4.0 | 27 | 2 |
| 6 | Zinc White PW4 | 77 | 16 | 4.0 | 0 | 0 | 0 |
| 7 | Cadmium Yellow PY35:1 | 70 | 13.5 | 4.25 | 3.35 | 7.7 | 1.2 |
| 8 | Ivory Black PBk9 | 56 | 3 | 5 | 1.25 | 28 | 3.5 |
| 9 | Violet PR88 PW24 | 6 45 | 34 | 5.5 | 0 | 8 | 1.5 |
| 10 | Phthalocyanine Blue | | | | | | |

TABLE I-continued

| Example No. | Color | Pts. by Wt. | Gel Base | Amine Soap | Aluminum Stearate | Linseed Oil | Emulsifier |
|---|---|---|---|---|---|---|---|
| | PB15 | 27 | 33 | 6.5 | 0 | 22 | 3.5 |
| | PW24 | 8 | | | | | |

The viscosity of each of the several pigment compositions shown in Table I was again dependant upon the particular pigment used, and was in a range of between 2,000,000 and 5,000,000 cps on the Brookfield viscometer.

EXAMPLE 11

For the preparation of a water-reducible, high pigment paint, or coating, composition, using the present invention, the following procedure can be followed: A. Diluted Base Gel Composition The finished product of Example 4, containing burnt sienna pigment, Pigment Brown:7 (Color Index No. 77492), was admixed with additional base gel composition prepared as in Example 1, and in the weight proportion of four parts gel to one part finished artists color of Example 4. This initial mixture is further diluted by adding about 3 parts by wt. of linseed oil (with about 6% added emulsifier, as used in Example 1) to dilute to the desired viscosity of about 2500–4000 cps (Brookfield measurements). The ingredients are being continuously mixed in the dual function disperser, operating at about 500 to about 1000 RPM.

After a uniformly diluted mixture is formed the usual amounts of drying agents, such as cobalt tallate or naphthenate, anti-skinning agents are added. A water-reducible, high load oil paint which can be used for coating, e.g., wood or metal surfaces, is thus prepared.

EXAMPLE 12

For the preparation of a water-reducible, high load, industrial oil paint coating composition, using the present invention, the following procedure can be followed:

A. Diluted base gel composition

A base gel composition (50 parts by wt.), prepared as in Example 1, is admixed with 29 parts by wt. of the finished artists oil color product of Example 1. This initial mixture is further diluted by adding about 18 parts by wt. of a 9:1 mixture of poppyseed and sunflower seed oil (with about 6% added emulsifier, as used in Example 1) to dilute to the desired viscosity of about 2500–4000 cps (Brookfield measurements). The mixtures are continuously being mixed in a dual function mixer, at about 500 to about 1000 RPM.

After a uniformly diluted mixture is formed the usual amounts of drying agents, such as 0.5 parts by wt. of cobalt tallate or naphthenate, and 0.5 parts by wt. of anti-skinning agents. A water-reducible, high pigment load, oil paint, which can be used for coating, e.g., wood or metal surfaces, is thus prepared.

The patentable embodiments of this invention which are claimed include:

1. A water-reducible artists' oil paint, capable of maintaining a stable suspension of coloring pigment during storage, and having the consistency and the manipulative characteristics of a short, buttery paste, and the working characteristics of a traditional oil paint, as defined in ASTM Method D4302-90, the oil paint comprising a pigment, a base gel composition and an emulsifier-amine soap composition; the base gel composition comprising a traditional drying or semi-drying oil, a nonionic or mixed nonionic-anionic emulsifier, having an HLB value in the range of at least 8, and a thixotropic gel stabilizer; the emulsifier-amine soap composition comprising at least one amine soap of an acid, selected from mono- and di-unsaturated drying oil acids, and a nonionic or mixed nonionic-anionic emulsifier.

2. The water-reducible artists' oil paint of claim 1, wherein the base gel and the emulsifier-amine soap composition are admixed in proportions in the range of from about 3:1 to about 12:1.

3. The water-reducible artists' oil paint of claim 2, wherein the drying and semi-drying oils are selected from the group consisting of linseed oil, safflower oil, sunflower oil, soya oil, poppyseed oil, walnut oil, tung oil and menhaden oil, and unsaturated fatty acids found in the group consisting of naturally occurring vegetable oils, and animal oils and unsaturated fractions thereof.

4. The water-reducible artists' oil paint of claim 2, wherein the HLB value of each emulsifier is in the range of from about 9 to about 13.

5. The water-reducible artists' oil paint of claim 2, wherein each emulsifier is compatible with the drying oil and is capable of undergoing oxidative drying and cross-linking with the drying oil.

6. The water-reducible artists' oil paint of claim 5, wherein each emulsifier comprises a monounsaturated group.

7. The water-reducible artists' oil paint of claim 6, wherein each emulsifier comprises a polyalkoxylated ester of a polyhydric alcohol.

8. The water-reducible artists' oil paint of claim 7, wherein each emulsifier comprises an ethoxylated ester of an unsaturated fatty acid having from about 12 to about 24 carbon atoms and a polyhydric alcohol having from 3 to about 6 hydroxyl groups and from 3 to about 8 carbon atoms.

9. The water-reducible artists' oil paint of claim 1, wherein the thixotropic gel stabilizer is selected from the group consisting of mono- and di-unsaturated hydroxy carboxylic acids having from 12 to about 20 carbon atoms and the polyhydric alcohol esters of the mono- and di-unsaturated hydroxy carboxylic acids.

10. The water-reducible artists' oil paint of claim 9, wherein the thixotropic gel stabilizer is a dehydrated glyceride of ricinoleic acid.

11. The water-reducible artists' oil paint of claim 1, wherein the amine soap composition comprises the reaction product of at least one unsaturated free fatty acid with an excess of the stoichiometric neutralization amount of a hydroxyamine.

12. The water-reducible artists' oil paint of claim 11, wherein the hydroxyamine contains from about three to about six carbon atoms.

13. The water-reducible artists' oil paint of claim 12, wherein the hydroxyamine is reacted with a fatty acid containing from about 12 to about 24 carbon atoms.

14. The water-reducible artists' oil paint of claim 1, wherein the base gel contains between about 30 and about 80 parts by weight of the drying oil, from about 2 to about 15 parts by weight of the emulsifier, and from about 2 to about 15 parts by weight of the thixotropic stabilizer.

15. The water-reducible artists' oil paint of claim 1, wherein the base gel is formed from a mixture of linseed oil and a mixture of poppyseed and sunflower oils.

16. The water-reducible artists' oil paint of claim 1, wherein the base gel, prior to admixture with the amine soap composition is subjected to an activation temperature in the range of from 120 to 170 degrees F. for at least about ten minutes.

17. A water-reducible, high tinctorial strength oil paint, capable of maintaining a stable suspension of coloring pigment during storage, the oil paint comprising i) from about 0.5 to about 40 parts by weight of a pigment, ii) from about 20 to about 30 parts by wt. of a base gel, iii) from about 2 to about 10 parts of an amine soap, iv) from about 25 to about 50 parts of a drying oil, and v) at least about 8% by wt. of the drying oil of an emulsifier having an HLB value in the range of at least 8 and selected from the group consisting of nonionic and mixed nonionic-anionic emulsifiers.

18. The water-reducible artists' oil paint of claim 17, wherein the base gel comprises the reaction product of a drying or semi-drying oil and a monounsaturated hydroxy acid compound which is chemically compatible with the drying oil; and wherein the amine soap comprises the reaction product of a free fatty acid, selected from the group consisting of mono- and di-unsaturated drying oil acids, and a hydroxyamine.

* * * * *